United States Patent
Suzuki et al.

(10) Patent No.: US 11,206,356 B1
(45) Date of Patent: Dec. 21, 2021

(54) APPARATUS, METHOD OF SAME, AND STORAGE MEDIUM THAT UTILIZES CAPTURED IMAGES HAVING DIFFERENT ANGLES OF VIEW

(71) Applicant: CANON KABUSHIKI KAISHA, Tokyo (JP)

(72) Inventors: Ryuta Suzuki, Kanagawa (JP); Takashi Ichimiya, Kanagawa (JP); Kouji Ikeda, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/332,809

(22) Filed: May 27, 2021

(30) Foreign Application Priority Data

Jun. 5, 2020 (JP) .............................. JP2020-098884

(51) Int. Cl.
*H04N 5/232* (2006.01)
*H04N 9/73* (2006.01)

(52) U.S. Cl.
CPC ..... *H04N 5/23296* (2013.01); *H04N 5/23267* (2013.01); *H04N 5/23293* (2013.01); *H04N 5/23299* (2018.08); *H04N 9/73* (2013.01)

(58) Field of Classification Search
CPC .......... H04N 5/23296; H04N 5/23299; H04N 5/23267; H04N 5/23293; H04N 5/772; H04N 5/2258; H04N 5/232933; H04N 9/73; H04N 13/239; H04N 13/286
USPC ....................................................... 348/240.1
See application file for complete search history.

(56) References Cited

U.S. PATENT DOCUMENTS

| | | | | |
|---|---|---|---|---|
| 8,917,334 | B2* | 12/2014 | Takeuchi ............... | G03B 13/36 348/240.99 |
| 9,188,791 | B2* | 11/2015 | Ishii ..................... | G02B 23/18 |
| 9,338,370 | B2* | 5/2016 | Au ...................... | H04N 5/23238 |
| 2003/0160886 | A1* | 8/2003 | Misawa ........... | H04N 5/232945 348/347 |
| 2009/0303354 | A1* | 12/2009 | Yanagi ................. | H04N 1/0044 348/240.1 |
| 2009/0315808 | A1* | 12/2009 | Ishii .................... | H04N 5/23258 345/1.3 |
| 2012/0026364 | A1 | 2/2012 | Kuma | |
| 2016/0133055 | A1* | 5/2016 | Fateh .................. | G06F 3/04845 345/633 |
| 2016/0198092 | A1* | 7/2016 | Ishii ..................... | G02B 7/102 348/208.2 |
| 2019/0208187 | A1* | 7/2019 | Danziger ............. | H04N 13/344 |

FOREIGN PATENT DOCUMENTS

JP 5223486 B2 6/2013
JP 2018-124523 A 8/2018

* cited by examiner

*Primary Examiner* — Pritham D Prabhakher
(74) *Attorney, Agent, or Firm* — Canon U.S.A., Inc. IP Division

(57) ABSTRACT

An apparatus includes a first capturing unit configured to obtain a first image; and a second capturing unit configured to obtain a second image having a wider angle of view than an angle of view of the first image. The apparatus controls each of a first display device corresponding to one eye of a user and a second display device corresponding to the other eye of the user to display an image based on the first image or the second image. In a case where no subject exists in the first image, the apparatus causes at least one of the first display device and the second display device to display the second image.

20 Claims, 10 Drawing Sheets

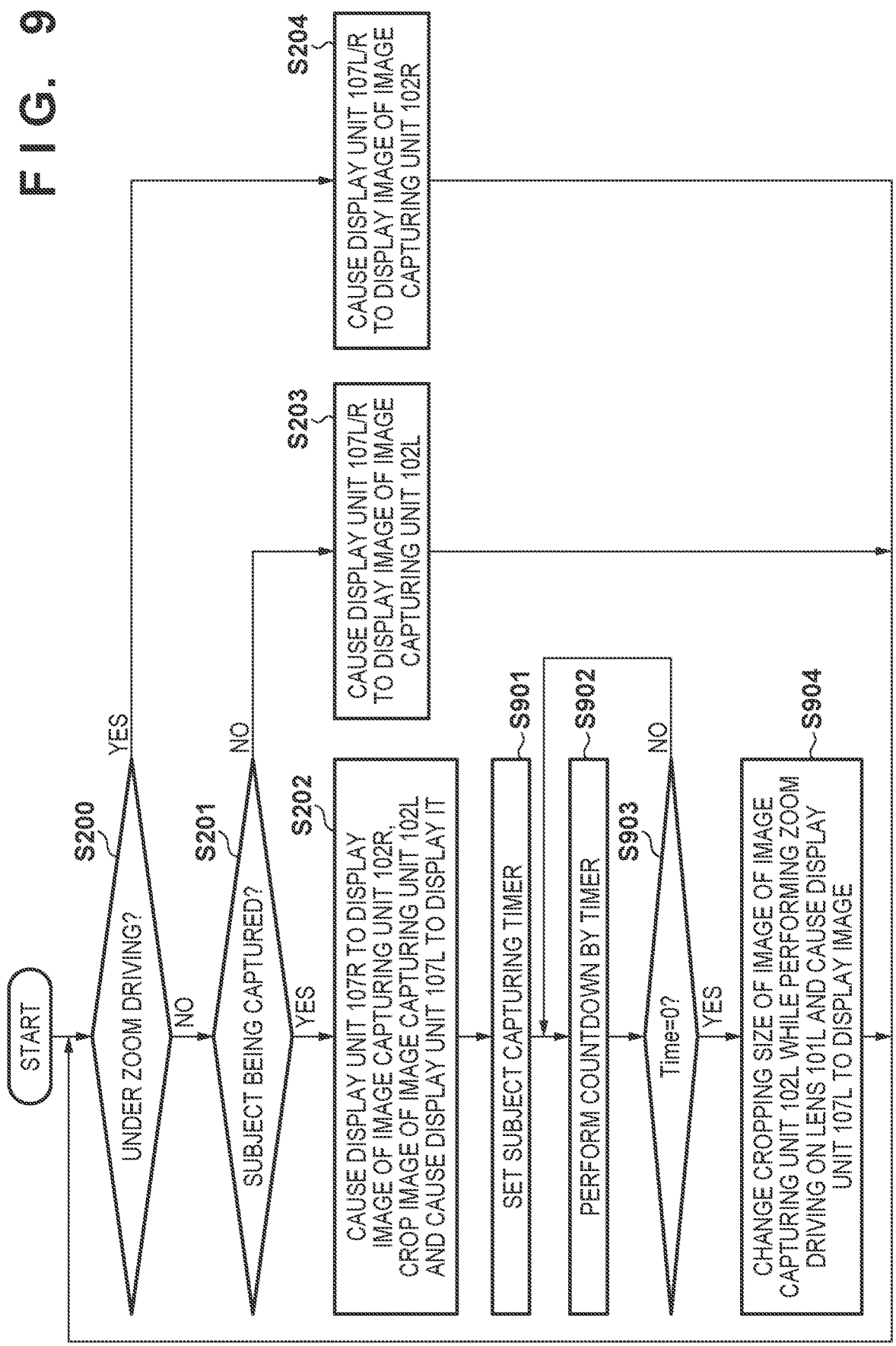

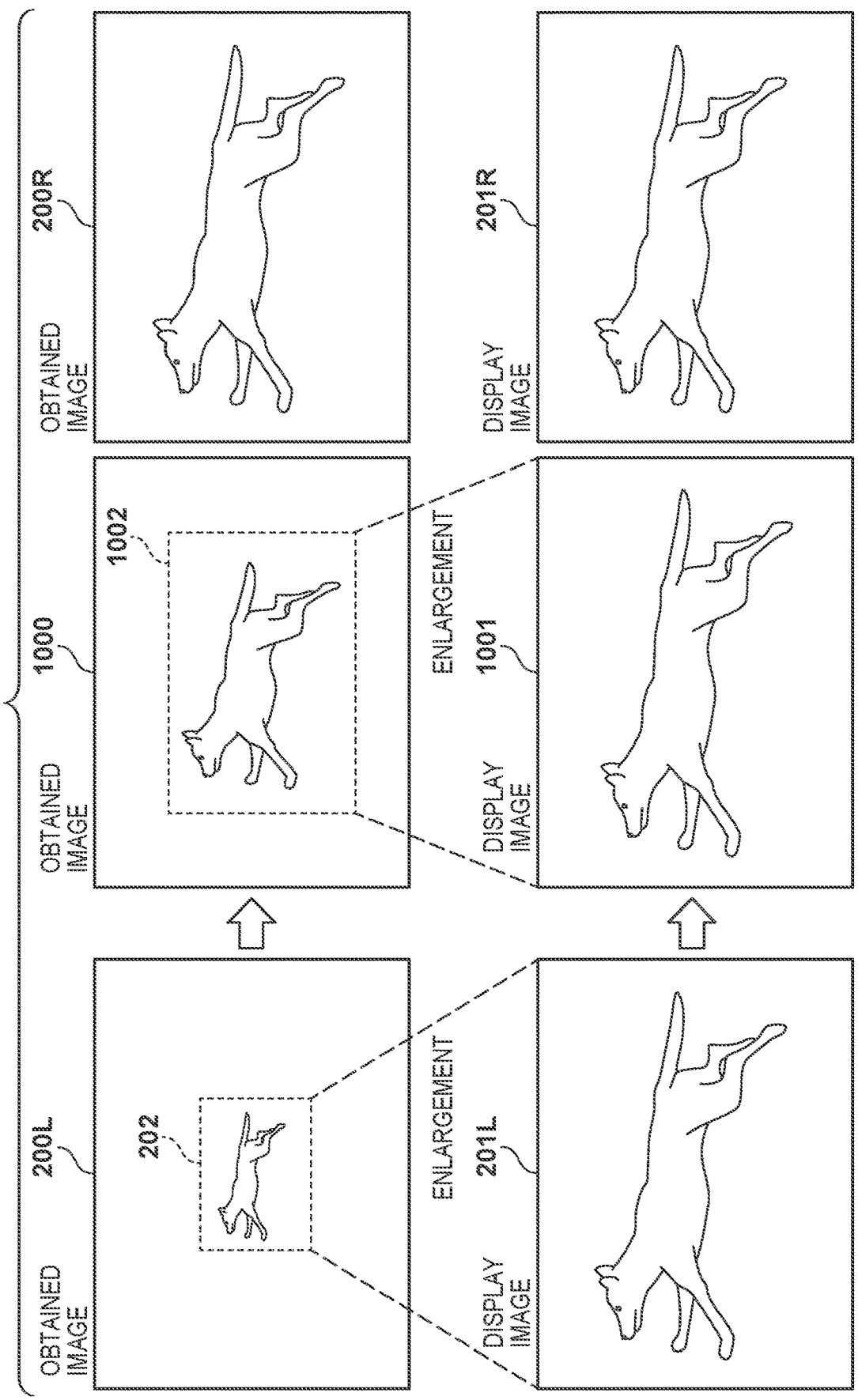

APPARATUS, METHOD OF SAME, AND STORAGE MEDIUM THAT UTILIZES CAPTURED IMAGES HAVING DIFFERENT ANGLES OF VIEW

BACKGROUND OF THE DISCLOSURE

Field of the Disclosure

The aspect of the embodiments relates to an apparatus, a method of the same, and a storage medium that utilizes captured images having different angles of view.

Description of the Related Art

In the related art, there is known an electronic apparatus such as electronic binoculars that makes a far away subject observable by capturing an image of an observation object (subject) by using an image capturing element, and displaying an image obtained by the image capture.

In such an electronic apparatus, in a case where the subject slightly shakes and moves, or in a case where a camera shake occurs, a position of the subject within an image displays shifts, and it becomes difficult to observe the subject. To address such a situation, Japanese Patent No. 5223486 proposes a technology in which in electronic binoculars including two image capturing units and two display units, an image obtained by correcting variation of movement of a casing, based on a sensor signal, is displayed.

However, in a case where a user loses sight of a subject due to movement of the subject such as a shift to the outside of an angle of view, it is difficult to search for the subject by continuing to looking through the electronic binoculars. In this case, the user is to perform an operation such as temporarily taking their eyes off the electronic binoculars to identify a subject position by naked eyes, and looking through the binoculars again.

SUMMARY OF THE DISCLOSURE

One aspect of the embodiments provides an apparatus comprising: a first capturing unit configured to obtain a first image; a second capturing unit configured to obtain a second image having a wider angle of view than an angle of view of the first image; and a control unit configured to control each of a first display device corresponding to one eye of a user and a second display device corresponding to the other eye of the user to display an image based on the first image or the second image, wherein, in a case where no subject exists in the first image, the control unit causes at least one of the first display device and the second display device to display the second image.

Another aspect of the embodiments provides, a method of an apparatus which includes a first capturing unit configured to obtain a first image; and a second capturing unit configured to obtain a second image having a wider angle of view than an angle of view of the first image, the method comprising: controlling each of a first display device corresponding to one eye of a user and a second display device corresponding to the other eye of the user to display an image based on the first image or the second image, wherein, in a case where no subject exists in the first image, the controlling includes causing at least one of the first display device and the second display device to display the second image.

Still another aspect of the embodiments provides, a non-transitory computer-readable storage medium comprising instructions for performing a method of an apparatus which includes a first capturing unit configured to obtain a first image; and a second capturing unit configured to obtain a second image having a wider angle of view than an angle of view of the first image, the method comprising: controlling each of a first display device corresponding to one eye of a user and a second display device corresponding to the other eye of the user to display an image based on the first image or the second image, wherein, in a case where no subject exists in the first image, the controlling includes causing at least one of the first display device and the second display device to display the second image.

According to the aspect of the embodiments, even in a case where a subject shifts to the extent that the subject lies beyond an angle of view, it becomes possible to facilitate capturing of the subject.

Further features of the disclosure will become apparent from the following description of exemplary embodiments (with reference to the attached drawings).

BRIEF DESCRIPTION OF THE DRAWINGS

FIG. 9 is a flowchart illustrating a sequence of operations of display control processing related to a second embodiment.

FIG. 10 is a figure illustrating an example of image display in a display unit at normal time related to the second embodiment.

DESCRIPTION OF THE EMBODIMENTS

First Embodiment

Figure 1:
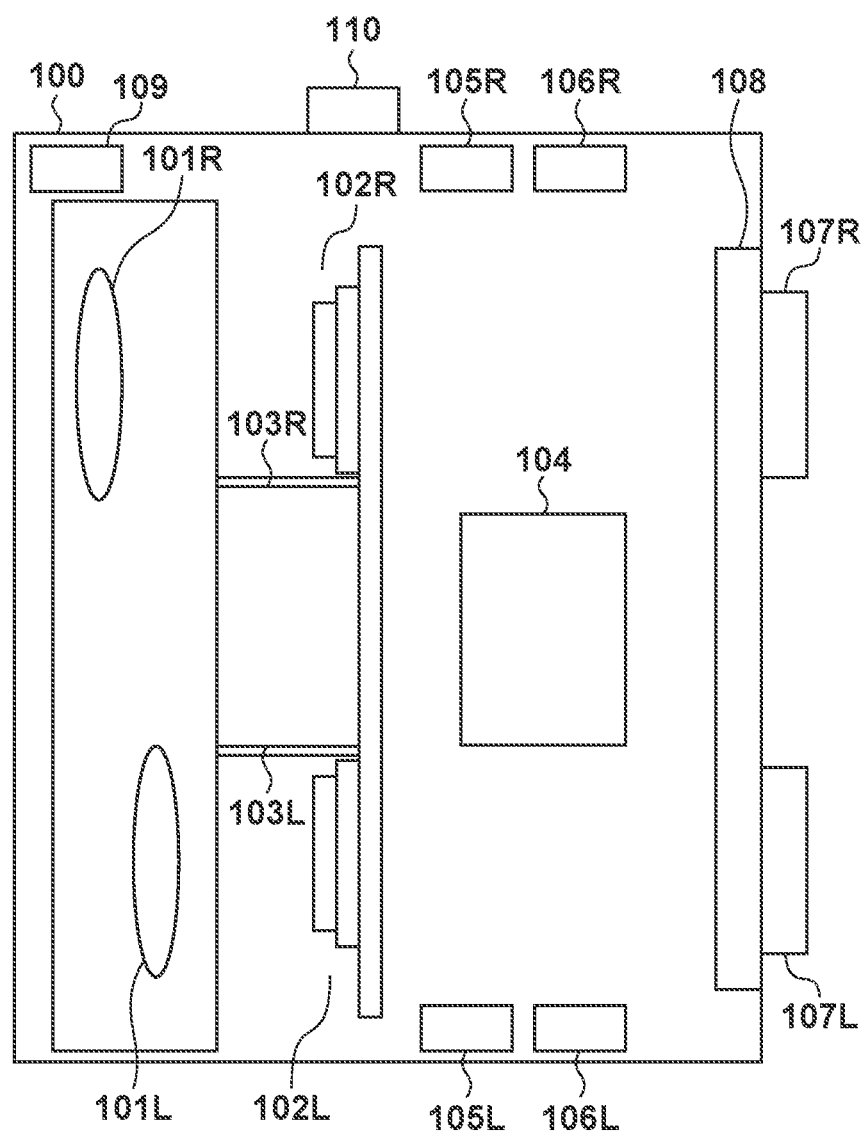
FIG. 1 is a block diagram illustrating a configuration example of electronic binoculars related to a first embodiment of the disclosure.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

As an example of an electronic apparatus, an example where electronic binoculars that can capture images having different angles of view by a plurality of image capturing units is used will be described below. However, the present embodiment is not limited to electronic binoculars and is also applicable to other devices that can capture images having different angles of view by a plurality of image capturing units. These devices may include, for instance, a spectacle-type information terminal, a digital camera, a mobile phone including a smartphone, a game machine, a tablet terminal, an endoscope, and a medical device for surgery.

Configuration of Electronic Binoculars 100

FIG. 1 is a block diagram illustrating a functional configuration example of electronic binoculars 100 as an example of an electronic apparatus of the present embodiment. Note that one or more of functional blocks illustrated in FIG. 1 may be accomplished by hardware such as an ASIC and a programmable logic array (PLA), or may be accomplished by causing a programmable processor such as a CPU and an MPU to execute software. In addition, one or more of the functional blocks illustrated in FIG. 1 may be accomplished by a combination of software and hardware.

A lens 101L of the left side and a lens 101R of the right side are arranged at a predetermined interval in front of the electronic binoculars 100. Each of an image capturing unit 102L of the left side and an image capturing unit 102R of the right side captures a subject image having passed through the lens 101L or the lens 101R, and outputs an image signal. Each of the lens 101L and the lens 101R may include a plurality of lenses. For instance, focus adjustment is accomplished by shifting a focus lens among the plurality of lenses along an optical axis. In addition, the lens 101L and the lens 101R each include a zoom lens having a focal distance that becomes variable by a shift of several lens groups. Note that the focal distances of the lens 101L and the lens 101R are independently changeable, and thus the focal distances of the respective lens 101L and 101R can be controlled to be identical or different. Note that, in description made below, description will be made taking as an example the case where the lens 101L and the lens 101R are each provided with a zoom lens having a variable focal distance, but the lens 101L and the lens 101R may be each provided with a fixed focal length lens having a fixed focal distance.

The image capturing unit 102L and the image capturing unit 102R each include, for instance, an image sensor (image capturing element) of a Complementary Metal Oxide Semiconductor (CMOS) type, or the like, and output a captured image signal. The image sensor may include various other types of image sensors such as a Charge Coupled Device (CCD). In addition, the image capturing unit 102L and the image capturing unit 102R are also each provided with a readout circuit or the like suitable for each of the image sensors. The image capturing unit 102L and the image capturing unit 102R obtain, as images, subject images having passed through the lens 101L and the lens 101R having different focal distances, and thus the image capturing unit 102L and the image capturing unit 102R can obtain images having different angles of view.

A linear motor 103L and a linear motor 103R can shift the lenses of the lens 101L and the lens 101R, respectively and perform focus adjustment and zoom driving. Zoom magnification of the left and right lenses can be changeable individually by separately controlling the linear motor 103L and the linear motor 103R.

A control unit 104 includes one or more processors, a RAM and a ROM, and executes various types of processing of the electronic binoculars 100 by causing the one or more processors to expand and execute, on the RAM, a program stored in the ROM. For instance, cropping processing is performed such that an obtained image obtained (captured) by the image capturing unit 102L and an obtained image obtained by the image capturing unit 102R have an identical angle of view, and an image subjected to the cropping processing is displayed on at least one (for example, both) of display units 107L and 107R. In addition, under a predetermined condition such as the case where the lens 101L and the lens 101R are being driven, the control unit 104 also controls display with respect to the display units 107L and 107R. Note that details of the cropping processing and the display control will be described below.

The control unit 104 determines whether or not a subject is captured within an angle of view, or performs white balance adjustment processing by using images captured by the image capturing unit 102L and the image capturing unit 102R. In addition, the control unit 104 calculates a camera shake amount in the image capturing unit, based on information from a gyro sensor 105L, a gyro sensor 105R, an acceleration sensor 106L and an acceleration sensor 106R. In addition, camera-shake correction can be performed by controlling optical axes of the lens 101L and the lens 101R by an optical axis control unit (not illustrated).

Each of the display unit 107L and the display unit 107R includes a display panel, and the display units 107L and 107R correspond to a left eye and a right eye of a user, respectively. In accordance with an instruction from the control unit 104, each of the display units 107L and 107R displays an image or the like that is captured by the image capturing unit 102L or the image capturing unit 102R. The display unit 107L and the display unit 107R are attached to a movable unit 108. The movable unit 108 is configured to slide or to cause the electronic binoculars 100 to axisymmetrically bend such that positions of the display unit 107L and the display unit 107R can match an interval between the left and right eyes of a person.

A distance measuring unit 109 is a unit that measures a distance from the electronic binoculars 100 to a subject. A state switching unit 110 is configured to, according to a manual operation described below, switch whether or not a subject is being captured, or enable a user to switch display contents of the display unit 107L and the display unit 107R. For instance, in a case where the state switching unit 110 includes a push button switch, when the push button switch is pressed once within a predetermined period of time, switching of subject capture information can be performed, and when the push button switch is continuously pressed twice within a predetermined period of time, switching of display contents of the display units 107L and 107R can be performed.

Sequence of Operations of Display Control Processing

Next, by referring to FIG. 2, display control processing of controlling display of the display unit 107L and the display unit 107R in the electronic binoculars 100 will be described. In the display control processing of the present embodiment, the zoom magnification of the lens 101R described above is controlled by an optical zoom mechanism. On the other hand, description will be made taking as an example the case where an angle of view of the lens 101L is controlled to become wider than an angle of view of the lens 101R and optical zoom is not performed. Note that the present processing is accomplished by causing the one or more processors of the control unit 104 to expand and execute, on the RAM, a program stored in the ROM.

At step S200, the control unit 104 determines whether or not the lens 101R is under the zoom driving (that is, the zoom lens is being driven by the optical zoom mechanism). In a case where, for instance, the control unit 104 obtains a zoom state of the lens 101R and determines that the lens 101R is under the zoom driving, the processing proceeds to step S204, and in a case where the control unit 104 determines that the lens 101R is not under the zoom driving, the processing proceeds to step S201.

At step S201, the control unit 104 determines whether or not, in an image obtained through the lens 101R equipped with the optical zoom mechanism, a subject is captured. This determination can be performed by, for instance, determining whether or not the subject exists in the image, or determining that the subject no longer exists in the image. The control unit 104 performs this determination by, for instance, automatically determining whether or not the subject in the image can be recognized by image recognition processing. Alternatively, the control unit 104 may perform this determination by using a manual operation input to the state switching unit 110 that is performed after a user has confirmed the image obtained through the lens 101R. In a case where the control unit 104 determines that the subject is captured in the image, the processing proceeds to step S202, and in a case where the control unit 104 determines that the subject is not captured in the image, the processing proceeds to step S203.

At step S202, the control unit 104 causes the display unit 107L and the display unit 107R to display (respective) images in which the subject is captured. A display method of the present step will be described by referring to FIG. 3.

Figure 3:
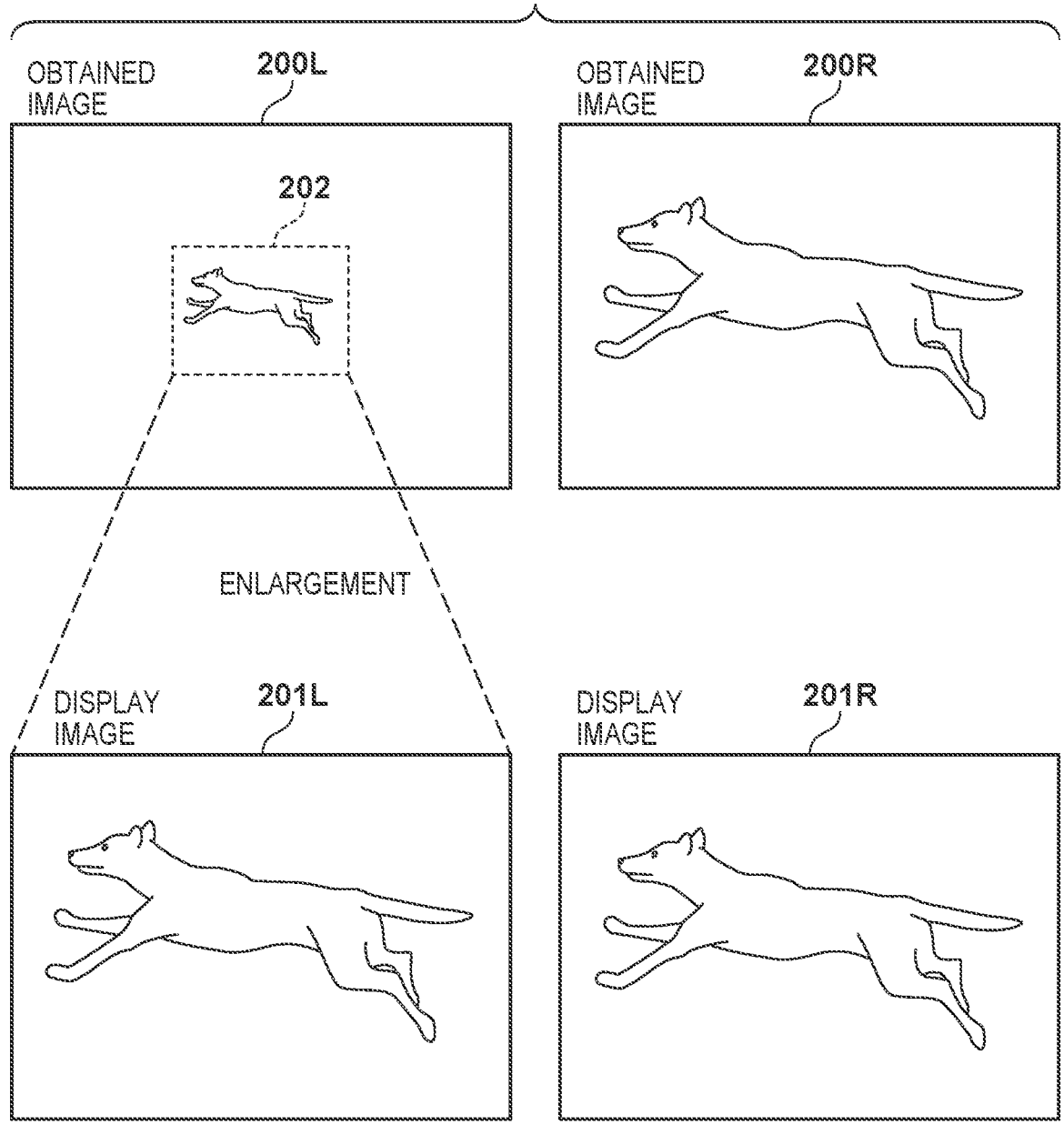
FIG. 3 is a figure illustrating an example of image display in a display unit at normal time related to the first embodiment.

An obtained image 200L illustrated in FIG. 3 represents an image obtained by the image capturing unit 102L, and an obtained image 200R represents an image obtained by the image capturing unit 102R. As described above, the angle of view of the lens 101L is controlled to become wider than the angle of view of the lens 101R, and thus the subject in the obtained image 200L becomes smaller than the subject in the obtained image 200R.

Figure 6:
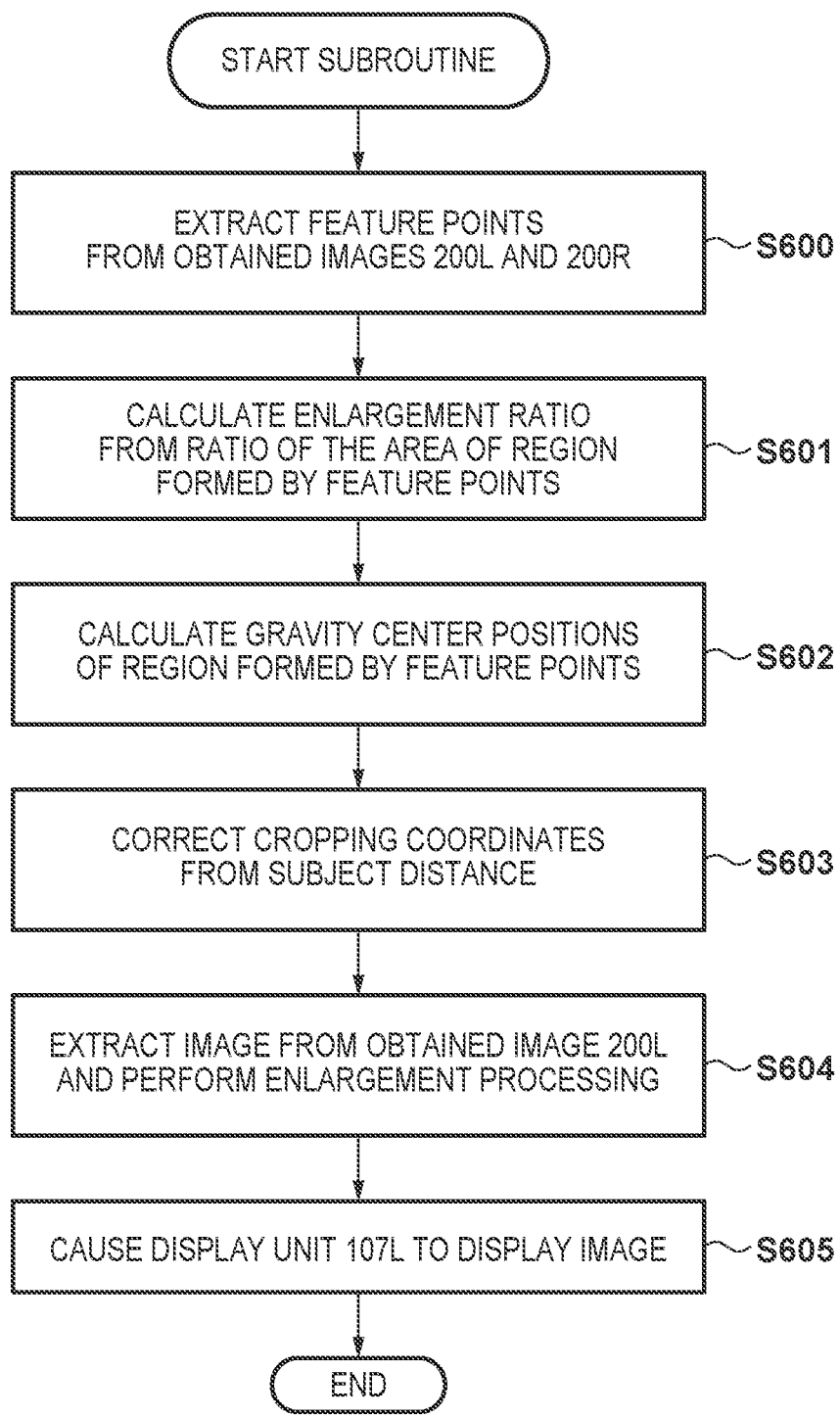
FIG. 6 is a flowchart illustrating a sequence of operations in cropping processing related to the first embodiment.

The control unit 104 performs the cropping processing on a region 202 of a portion of the obtained image 200L to generate a display image 201L, and causes the display unit 107L to display the display image 201L. A display image 201R is identical to the image of the obtained image 200R, and the obtained image 200R is displayed as it is on the display unit 107R. Note that details of the cropping processing by the control unit 104 will be described below by referring to FIG. 6. Angles of view of the display images 201L and 201R are controlled to become approximately identical by the cropping processing.

Figure 4:
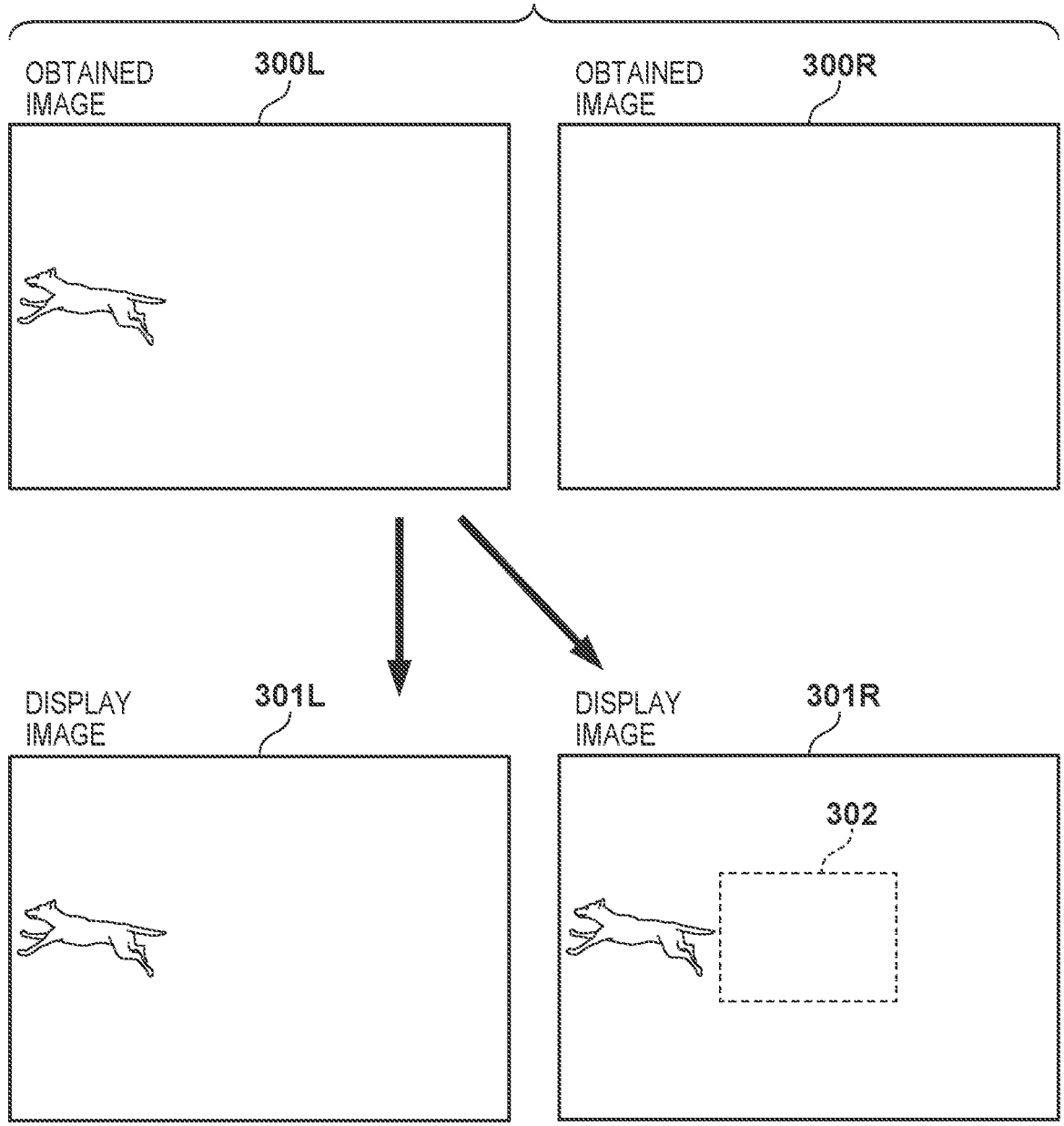
FIG. 4 is a figure illustrating an example of image display in the display unit in the case of losing sight of a subject related to the first embodiment.

At step S203, the control unit 104 has lost sight of the subject in the state at step S202, and thus the control unit 104 causes the display unit 107L and the display unit 107R to display the image of the image capturing unit 102L. A specific display method of the present step will be described by referring to FIG. 4.

An obtained image 300L represents an image obtained by the image capturing unit 102L, and an obtained image 300R represents an image obtained by the image capturing unit 102R. At this time, the subject is not captured in the obtained image 300R having passed through the lens 101R performing optical zoom, and thus no subject exists in the obtained image 300R. On the other hand, an image having passed through the lens 101L is captured at a wide angle, and thus the subject exists on the obtained image 300L.

Thus, the control unit 104 causes the display unit 107L to display, as a display image 301L, the obtained image 300L as it is. On the other hand, the control unit 104 causes the display unit 107R to display the obtained image 300L (in place of the obtained image 300R) as it is. At this time, the control unit 104 may cause a magnification frame 302 of current optical zoom to be displayed in a display image 301R to indicate that the display image 301R is not an image obtained through the lens 101R.

In this manner, when the subject is not captured at the angle of view of the lens 101R performing optical zoom, the image obtained through the lens 101L having a wide angle is displayed on both the display unit 107L and the display unit 107R. In this manner, the user can find the subject by keeping looking at the display units 107L and 107R. Note that in the description described above, the obtained image 300L is displayed on both the display units, but the obtained image 300L may be displayed on one of the display units (for instance, the display unit 107L), alone.

At step S204, since the user is performing the zoom driving on the lens 101R by the optical zoom mechanism, the control unit 104 causes the display unit 107L and the display unit 107R to display the image of the image capturing unit 102R. By referring to FIG. 5, a display method of step S204 will be described.

Figure 5:
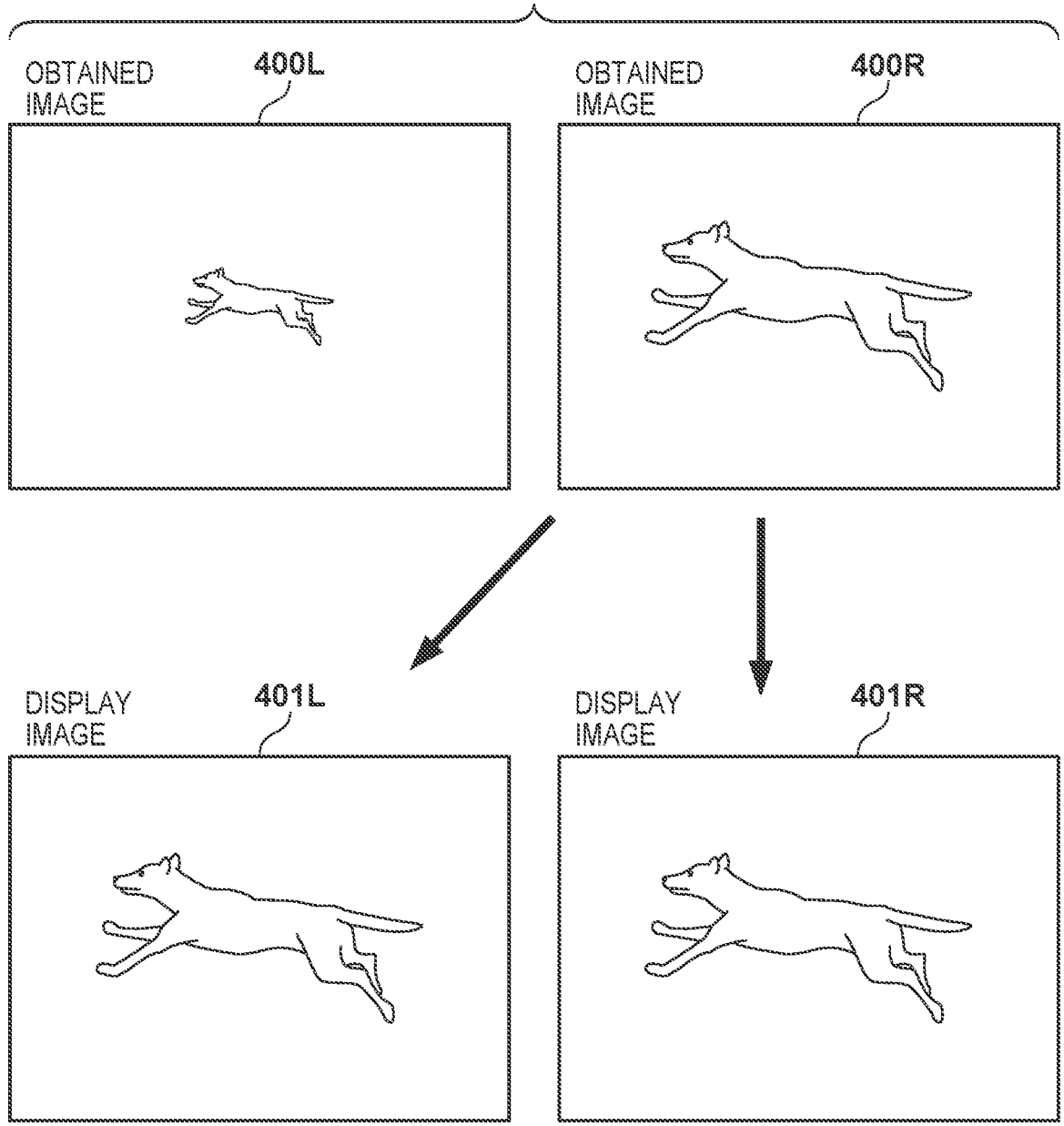
FIG. 5 is a figure illustrating an example of image display in the display unit at the time of zoom driving related to the first embodiment.

Note that an obtained image 400L illustrated in FIG. 5 represents an image obtained by the image capturing unit 102L, and an obtained image 400R represents an image obtained by the image capturing unit 102R.

In a case where the zoom lens is being driven (under the zoom driving) in the lens 101R, the size of the subject in the obtained image 400R varies. Thus, the control unit 104 causes the display unit 107L and the display unit 107R to display, as a display image 401L and a display image 401R, the obtained image 400R, as it is, and does not use the obtained image 400L for display. In this manner, under the zoom driving, the obtained image 400R obtained while driving the zoom lens is displayed on each of the display units, and accordingly, an image shift or delay can be reduced in comparison to the case of performing the cropping processing in real time, instead. Thus, it becomes easy for the user to set a display image at a desired angle of view.

Note that, at steps S202 to S204 described above, predetermined image processing such as white balance processing and camera-shake correction processing may be applied when an image is displayed. Here, the matters particularly relating to the present embodiment are described, and general description of the image processing is omitted, but the present embodiment is not limited to the matters described, alone.

In a case where the white balance processing is performed, an image signal is to be adjusted, based on a combination of characteristics of the image capturing side and the display side. That is, an image is to be corrected in consideration of both manufacture variation of a color sensitivity ratio in the image sensor of the image capturing unit and manufacture variation of color light emission efficiency of the display panel.

In the processing at step S202 described above, on one hand, an appropriate adjustment coefficient is used in a combination of the image capturing unit 102L and the display unit 107L and, on the other hand, an appropriate adjustment coefficient is used in a combination of the image capturing unit 102R and the display unit 107R, and the white balance adjustment is performed.

At step S204, on one hand, an appropriate adjustment coefficient is used in a combination of the image capturing unit 102R and the display unit 107L, and on the other hand, an appropriate adjustment coefficient is used in a combination of the image capturing unit 102R and the display unit 107R. That is, the combination of the image capturing unit and the display unit is different from the combination of the image capturing unit and the display unit at step S202, and thus a different value of the adjustment coefficient is also used.

In addition, the same applies to the camera-shake correction. That is, the camera-shake correction is performed in accordance with a combination of zoom ratios in the lens 101L and the lens 101R, the gyro sensor 105L and the gyro sensor 105R that are of the left and the right, respectively, the acceleration sensor 106L, and the acceleration sensor 106R that are of the left and the right, respectively. That is, the camera-shake correction is performed by independently adjusting control of the optical axis of the lens 101L and the optical axis of the lens 101R.

Sequence of Operations Related to Cropping Processing

Further, the cropping processing at S202 described above will be described in more detail. Note that here, a method of cropping while comparing the obtained images via the lenses 101R and 101L will be described. The present processing is accomplished by causing the one or more processors of the control unit 101 to expand and execute, on the RAM, a program stored in the ROM.

Figure 2:
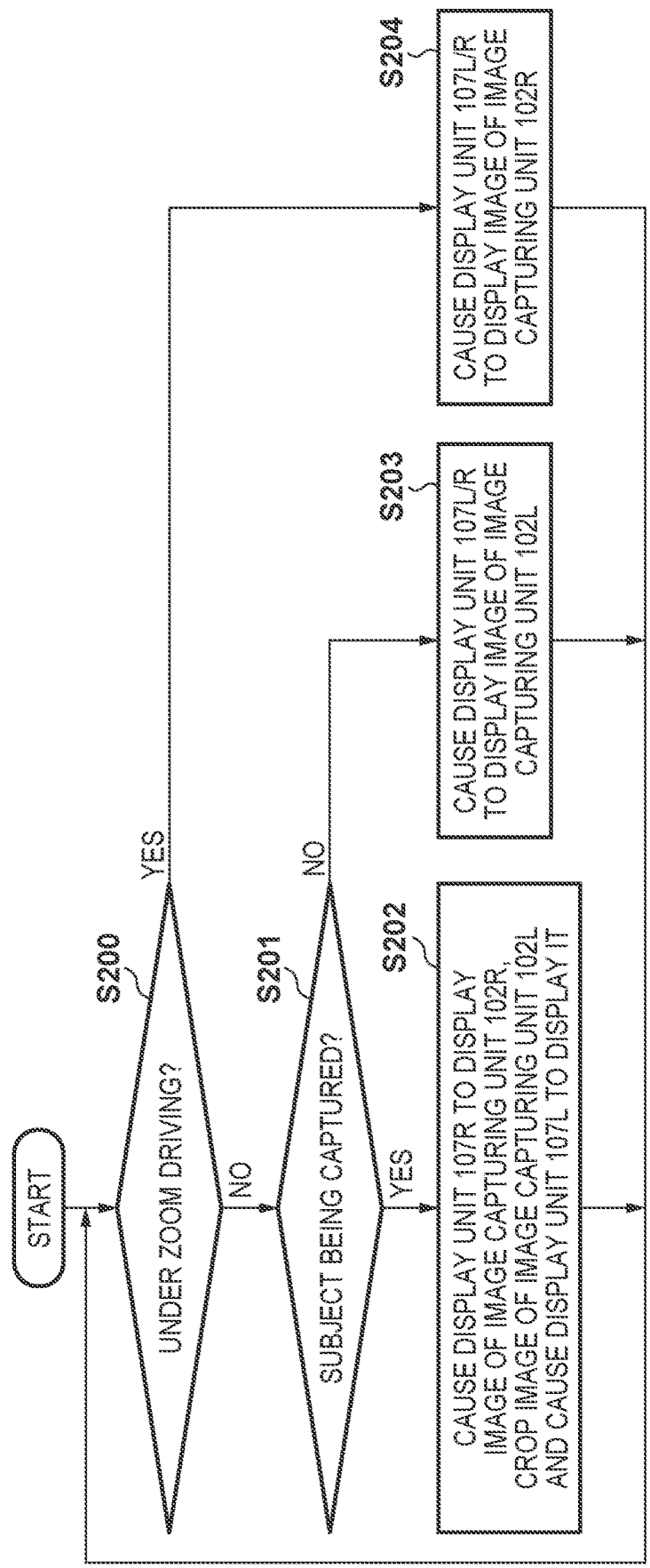
FIG. 2 is a flowchart illustrating a sequence of operations of display control processing related to the first embodiment.
Figure 7:
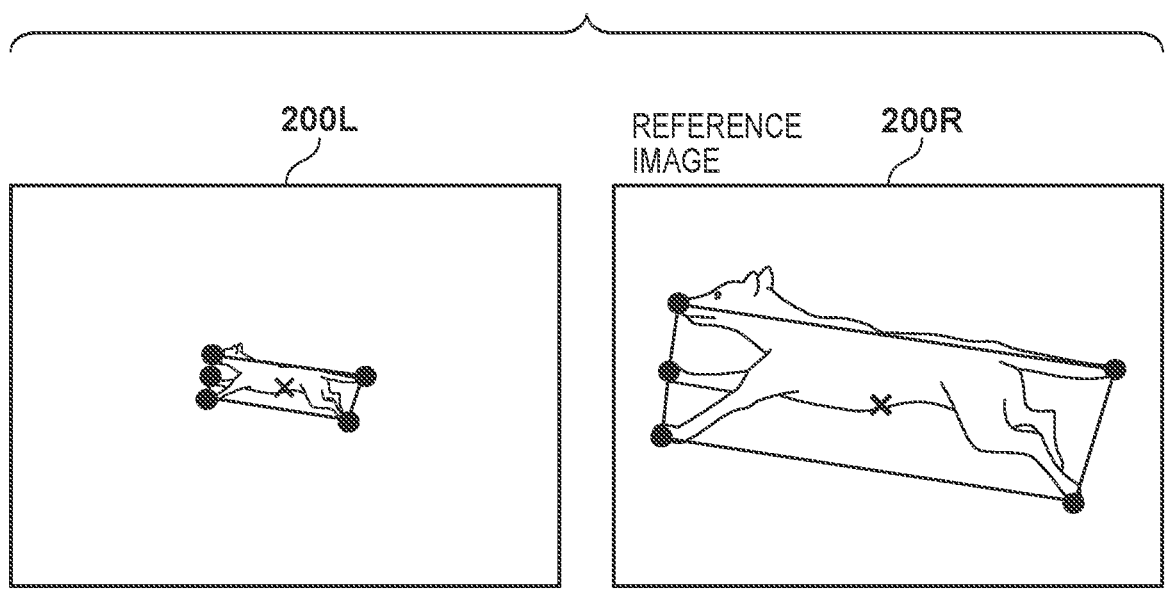
FIG. 7 is a figure illustrating a sequence of operations in the cropping processing related to the first embodiment.

At step S600, the control unit 104 extracts, as feature points, edge portions of the subjects from the obtained image 200L and the obtained image 200R obtained at step S202 (FIG. 2). For instance, in FIG. 7, an image example in a case where the feature points in the obtained image 200L and the obtained image 200R are extracted is schematically illustrated. In this example, detected feature points are indicated by black dots.

At step S601, the control unit 104 calculates a ratio of the area from the area of a region formed by connecting the feature points. In a case where the obtained image 200R is taken as a reference image, this ratio of the area corresponds to an enlargement ratio obtained after the obtained image 200L is cropped. Note that the control unit 104 also determines, from a calculated enlargement ratio, the size of a region to be cropped in the obtained image 200L.

At step S602, the control unit 104 calculates respective gravity center positions of the regions formed by connecting the feature points. In the example illustrated in FIG. 7, the gravity center positions are indicated by x marks. The control unit 104 further calculates a difference in the respective gravity center positions, and determines a crop position from center coordinates of the obtained image 200L and the "difference in the gravity center positions."

At step S603, the control unit 104 corrects the crop position, based on distance information provided from the distance measuring unit 109. This is because the left image and the right image can generally correspond to each other in accordance with the crop position determined at step S602, but it is actually necessary to correct the crop position in accordance with the distance to the subject.

Figure 8:
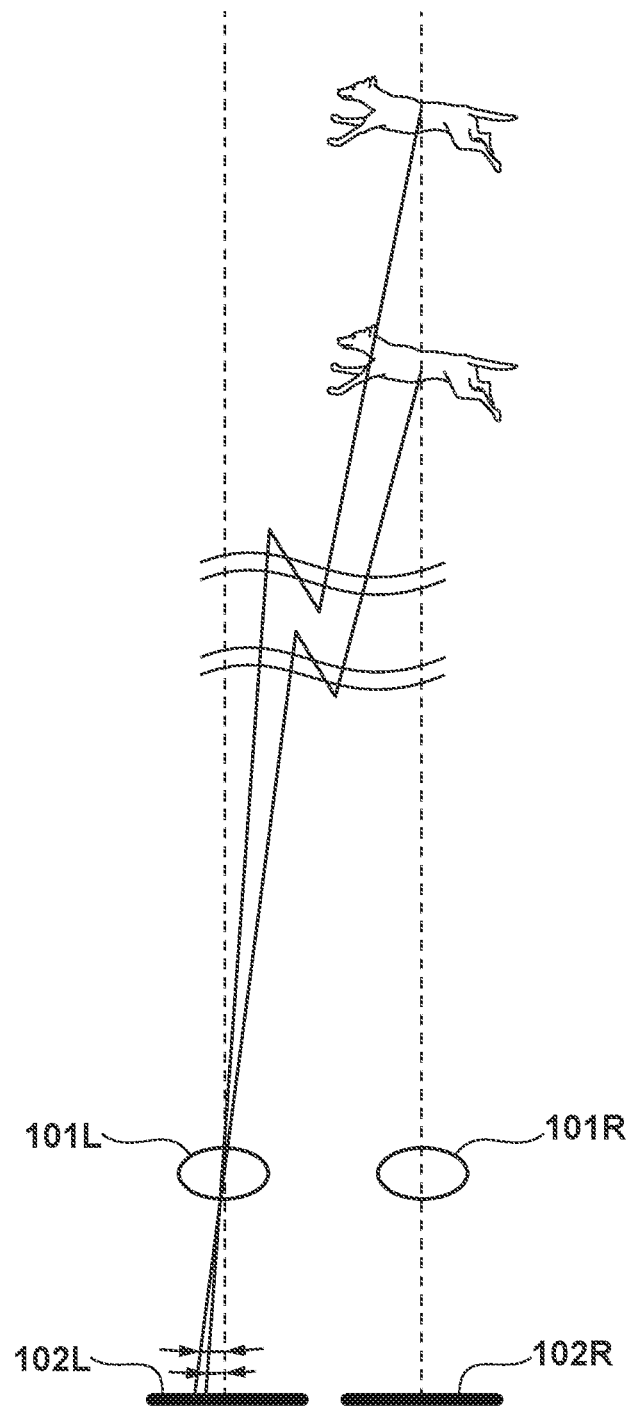
FIG. 8 is a figure illustrating a relation between a distance and a shift amount of an image capture position related to the first embodiment.

In FIG. 8, a relation between a subject distance and a shift amount of subject positions in the image capturing units of the left and the right. Dashed lines illustrated in FIG. 8 indicate the optical axis center of the lens 101L and the optical axis center of the lens 101R, respectively. A reference image is the obtained image 200R, and a position of the subject captured by the image capturing unit 102R invariably corresponds to the optical axis regardless of the distance to the subject. On the other hand, a position of the subject captured by the image capturing unit 102L shifts from a position on the optical axis in accordance with the subject distance. In FIG. 8, the shift amount is indicated by an arrow, and as the distance to the subject is closer, the shift amount becomes larger.

Thus, when cropping and displaying are performed at the position calculated at step S602, the subject invariably exists on the optical axes of the image capturing units of the left and the right (since the shift amount according to the subject distance is not considered, this is different from an actual state). That is, the distance to the subject or a stereoscopic effect appears different from an actual state.

Then, the control unit 104 corrects the position by the shift amount (by the amount indicated by the arrow in FIG. 8) from the crop position determined at step S602. Specifically, the control unit 104 calculates the shift amount by using a known triangulation method from the distance to the subject detected by the distance measuring unit 109, and the base line lengths and the focal distances of the lens 101L and the lens 101R.

At step S604, the control unit 104 extracts an image to be cropped from the obtained image 200L, and subjects an extracted image to enlargement processing. For instance, the control unit 104 performs the image extraction processing and the enlargement processing with respect to the obtained image 200L, based on the crop position and the enlargement ratio calculated in the operations at steps S601 to S603.

At step S605, the control unit 104 causes the display unit 107L to display an extracted and enlarged image. The control unit 104 subsequently ends the present processing, and the processing returns to S202 that is a call source.

In this manner, in the cropping processing related to the present embodiment, the obtained image 200L and the obtained image 200R are compared to calculate the crop position, and further the crop position is corrected by the shift amount according to the subject distance. In this manner, a cropped image having a reduced sense of unnaturalness can be displayed to the user.

Note that the control unit 104 may perform the cropping by a method different from the cropping processing described above. For instance, first, a relation between crop magnification and a crop position corresponding to a zoom position is measured in advance at the time of manufacture of the electronic binoculars 100, and data obtained by the measurement is stored in, for instance, the ROM or the like. Then, when the electronic binoculars 100 is used, the control unit 104 readouts the crop magnification and the crop position with respect to zoom position information and performs image processing. In this case, for instance, a configuration where the zoom position can be detected by attaching a potentiometer to the lens 101L and the lens 101R may be used. In this configuration, a load of the control unit 104 can be alleviated and an effect of alleviating power consumption can be expected, in comparison to the above-described method of performing the cropping processing by comparing the images.

On the other hand, actually, optical characteristics of the lens (magnification, the lens optical axis center, or the like) vary due to temperature and humidity in a use environment, and thus more accurate display can be performed by the cropping processing including the comparison of the images.

Modification of First Embodiment

In the first embodiment described above, the control unit 104 is configured to cause the display units of the left and the right to display, under the zoom driving, the image captured at a wide angle. The displaying in this manner may reduce the distance to the subject and the stereoscopic effect as described by referring to FIG. 8. Then, the sense of unnaturalness of the display of the left and the right may be alleviated by performing the cropping processing also under the zoom driving. In addition, it is also conceivable that tolerance of a display error increases (due to variation of a subject) under the zoom driving. Thus, it becomes possible to provide a display image at high speed and with sufficient display quality by using, for instance, the above-described method of performing the cropping processing, based on the "magnification and the position stored in advance," in which a processing load of the control unit 104 is reduced.

As described above, in the present embodiment, a first image and a second image having a wider angle of view than an angle of view of the first image are obtained, and each of the two display units is controlled to display an image based on the first image or the second image. Particularly, in a case where no subject exists in the first image having a narrow angle of view, the second image having a wide angle of view is displayed on at least one of the two display units. In this manner, even in a case where a subject shifts to the extent that the subject lies beyond an angle of view, it becomes possible to facilitate capturing of the subject.

Second Embodiment

Next, a second embodiment will be described. The second embodiment differs from the first embodiment in that optical zoom is controllable also in a lens 101L. In addition, in the present embodiment, when it is determined whether a subject is captured, a subject capturing timer is used to detect that a main subject stably exists in an obtained image. This subject capturing timer, may be constituted inside a control unit 104, and when it is detected that the subject exists in a predetermined range of the image, the timer starts. Then, based on whether or not to keep detecting the subject for certain time, it is determined whether or not the subject stably exists in the predetermined range. In capture stability detection processing using this subject capturing timer, the control unit 104 can determine whether the subject moving at high speed only momentarily exists in the predetermined range, or can determine whether the subject can be kept being captured stably.

Note that other configurations of electronic binoculars 100 related to the present embodiment are identical or substantially identical to the configurations in the first embodiment. Thus, the identical or substantially identical configurations will be denoted by identical reference signs, and description of those configurations will be omitted, and description will be made focusing on differences.

Sequence of Operations of Display Control Processing

By referring to FIG. 9, display control processing of controlling display on a display unit 107L and a display unit 107R, related to the present embodiment will be described. Note that, as with the first embodiment, the display control processing in the present embodiment is accomplished by causing one or more processors of the control unit 104 to expand and execute, on a RAM, a program stored in a ROM.

First, as with the first embodiment, the control unit 104 executes processing of steps S200 to S204, and performs display control in accordance with a zoom driving state or a capture state of the subject.

At step S901, after the control unit 104 causes at step S202 the display unit 107L to display an image obtained by cropping an image of an image capturing unit 102L, the control unit 104 sets predetermined time in the subject capturing timer as a capture stability detection unit. Note that the predetermined time may be a value set in advance (for instance, three seconds), or may be changed by a user.

Note that as result of determining at step S201 that the subject is captured, the control unit 104 may transition to step S901 and may simultaneously execute step S202.

At step S902, the control unit 104 starts a countdown by the timer. Then, at step S903, the control unit 104 determines whether a value of the timer is zero and, in a case where the control unit 104 determines that a value of the timer is zero, the processing proceeds to step S904. On the other hand, in a case where the control unit 104 determines that a value of the timer is not zero, the processing returns to step S902. That is, the control unit 104 repeats the countdown at step S902 until a value of the timer becomes zero, and when a value of the timer becomes zero, the processing proceeds to step S904.

At step S904, the control unit 104 changes the cropping size of the image of the image capturing unit 102L while performing the zoom driving on the lens 101L, and the control unit 104 causes the display unit 107L to display a cropped image. At this time, the control unit 104 performs the zoom driving in combination with the change of the cropping size such that the size of the subject displayed on the display unit 107L is maintained. In this manner, it becomes possible to increase zoom magnification without giving a sense of unnaturalness to the user looking at the image on the display unit. The zoom driving of the lens 101L and the change of the cropping size are continued until the zoom magnification of the lens 101L and a lens 101R becomes identical. When the zoom magnification of the lens 101L and the lens 101R becomes identical, the control unit 104 continues display in that state.

Further, by referring to FIG. 10, display control at step S904 will be described. At the beginning of step S904, an obtained image 200L is an image obtained by the image capturing unit 102L, and, in addition, an obtained image 200R is an image obtained by an image capturing unit 102R. An image having passed through the lens 101L has a wider angle than an angle of an image having passed through the lens 101R, and thus the subject in the obtained image 200L is smaller than the subject in the obtained image 200R. In this state, when the control unit 104 performs the zoom driving on the lens 101L (such that angles of view of the two obtained images come close to each other), the subject is enlarged, and the obtained image 200L becomes an obtained image 1000. At this time, when the control unit 104 also simultaneously changes the cropping size to a region 1002, a display image becomes a display image 1001. At this time, the control unit 104 further adjusts the cropping size such that the size of the subject becomes identical to the size of the subject in the obtained image 200L. In this manner, enlargement magnification of the cropping of the display image 1001 is reduced in comparison with enlargement magnification of the cropping of a display image 201L, and thus a rate of a decrease in resolution of the image due to the cropping is reduced, and degradation in image quality can be suppressed.

Subsequently, the control unit 104 enlarges, by further increasing the zoom magnification, the subject size in the obtained image 1000 until the subject size in the obtained image 1000 becomes equal to the subject size in the obtained image 200R. In this manner, in a case where the subject can be captured stably, it is unnecessary to perform the cropping of the display image 201L, and thus degradation in image quality due to the cropping can be prevented.

As described above, in the present embodiment, after a display image obtained by the cropping processing from the obtained image 200L is displayed, the zoom driving of the lens 101L and the cropping size are continuously changed, and thus degradation in image quality due to the cropping processing of the display image 201L can be prevented.

Note that in the present embodiment, description was made taking as an example the case of continuously changing the zoom driving of the lens 101L and the cropping size. However, the display image 201L may be held temporarily in a memory and the image may be kept being held for certain time (for instance, 0.1 seconds), and the display image may be changed step by step, rather than continuously. In this manner, the zoom driving of the lens 101L can be performed at high speed and greatly, and zoom magnification at a passing point of the zoom driving can be predicted to determine the cropping size and perform the cropping processing. In other words, it is also possible to reduce the time until completion of the zoom driving of the lens.

In addition, in the present embodiment, description was made taking as an example the case of using the subject capturing timer as the capture stability detection processing. However, the present embodiment is not limited to this example, and any other method may be used as long as it can be detected that the subject stably exists in the predetermined range of the image. For instance, the electronic binoculars 100 may be equipped with an acceleration sensor (not illustrated), and when acceleration is almost at zero, it may be determined that the subject is captured. Alternatively, image identification may be executed continuously by the control unit 104, and it may be determined based on continuous identification results that the subject stably exists.

Further, in the first embodiment and the second embodiment, description was made taking as an example the case where the zoom in the lens 101R is optical zoom, but the zoom in the lens 101R is not limited to optical zoom, and electronic zoom (cropping processing) may be used.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-098884, filed Jun. 5, 2020, which is hereby incorporated by reference herein in its entirety.

What is claimed is:

1. An apparatus comprising:
a first capturing unit configured to obtain a first image;
a second capturing unit configured to obtain a second image having a wider angle of view than an angle of view of the first image; and
a control unit configured to control each of a first display device corresponding to one eye of a user and a second display device corresponding to the other eye of the user to display an image based on the first image or the second image,
wherein, in a case where no subject exists in the first image, the control unit causes at least one of the first display device and the second display device to display the second image.

2. The apparatus according to claim 1, wherein, in a case where the subject exists in the first image, the control unit causes the first display device to display the first image, and causes the second display device to display a portion of the second image including the subject.

3. The apparatus according to claim 2, wherein the control unit causes the second display device to display a portion of the second image such that the first image and the portion of the second image have an approximately identical angle of view.

4. The apparatus according to claim 3, wherein the control unit crops and enlarges a portion of the second image from the second image such that the first image and the portion of the second image have an approximately identical angle of view.

5. The apparatus according to claim 4, wherein the control unit executes first image processing of cropping and enlarging a portion of the second image in accordance with a crop position and an enlargement ratio that are set in advance.

6. The apparatus according to claim 5, wherein the control unit executes second image processing of cropping and enlarging a portion of the second image from the second image by determining a crop position and an enlargement ratio of the portion of the second image, based on comparison between a region of a subject in the first image and a region of the subject in the second image.

7. The apparatus according to claim 6, wherein the first capturing unit comprises a zoom mechanism configured to change an angle of view of an obtained image, wherein in a case where an operation of driving the zoom mechanism is being performed, the control unit
executes the first image processing, and
after the operation of driving the zoom mechanism ends, the control unit executes the second image processing.

8. The apparatus according to claim 5, further comprising a measuring unit configured to measure a distance to a subject,
wherein the control unit corrects the crop position in accordance with a distance to a subject measured by the measuring unit.

9. The apparatus according to claim 2, wherein, in a case where a predetermined operation is being performed on the apparatus, the control unit causes the first display device and the second display device to display the first image regardless of whether or not the subject exists in the first image.

10. The apparatus according to claim 9, wherein the first capturing unit includes a zoom mechanism configured to change an angle of view of the obtained first image, and
the predetermined operation is an operation of changing an angle of view of an image obtained by the zoom mechanism.

11. The apparatus according to claim 1, wherein at least one of the first capturing unit and the second capturing unit includes a zoom mechanism configured to change an angle of view of an image.

12. The apparatus according to claim 11, further comprising a detection unit configured to detect that a subject exists in a predetermined range of the second image for a predetermined period of time,
wherein, in a case where the detection unit detects that a subject exists in the predetermined range of the second image for the predetermined period of time, the control unit controls the zoom mechanism such that an angle of view of the first image and an angle of view of the second image come close to each other.

13. The apparatus according to claim 1, further comprising a first camera-shake correction unit configured to control a position of an optical axis of the first capturing unit to correct a camera shake, and a second camera-shake correction unit configured to control a position of an optical axis of the second capturing unit to correct a camera shake,
wherein the first camera-shake correction unit and the second camera-shake correction unit independently perform camera-shake correction.

14. The apparatus according to claim 1, wherein the control unit performs different white balance adjustment with respect to each of the first image and the second image.

15. A method of an apparatus which includes a first capturing unit configured to obtain a first image; and a second capturing unit configured to obtain a second image having a wider angle of view than an angle of view of the first image, the method comprising:
controlling each of a first display device corresponding to one eye of a user and a second display device corresponding to the other eye of the user to display an image based on the first image or the second image,
wherein, in a case where no subject exists in the first image, the controlling includes causing at least one of the first display device and the second display device to display the second image.

16. The method according to claim 15, wherein, in a case where the subject exists in the first image, the controlling causes the first display device to display the first image, and causes the second display device to display a portion of the second image including the subject.

17. The method according to claim 15, wherein the controlling performs different white balance adjustment with respect to each of the first image and the second image.

18. A non-transitory computer-readable storage medium comprising instructions for performing a method of an apparatus which includes a first capturing unit configured to obtain a first image; and a second capturing unit configured to obtain a second image having a wider angle of view than an angle of view of the first image, the method comprising:
controlling each of a first display device corresponding to one eye of a user and a second display device corresponding to the other eye of the user to display an image based on the first image or the second image,
wherein, in a case where no subject exists in the first image, the controlling includes causing at least one of the first display device and the second display device to display the second image.

19. The non-transitory computer-readable storage medium according to claim 18, wherein, in a case where the subject exists in the first image, the controlling causes the first display device to display the first image, and causes the second display device to display a portion of the second image including the subject.

20. The non-transitory computer-readable storage medium according to claim 18, wherein the controlling performs different white balance adjustment with respect to each of the first image and the second image.

* * * * *